US011898727B2

(12) United States Patent
Yan et al.

(10) Patent No.: US 11,898,727 B2
(45) Date of Patent: Feb. 13, 2024

(54) LINE LAMP

(71) Applicant: Hangzhou Hangke Optoelectronics Co., Ltd., Hangzhou (CN)

(72) Inventors: Qianjun Yan, Hangzhou (CN); Zhaozhang Zheng, Hangzhou (CN); Lingli Ma, Hangzhou (CN)

(73) Assignee: Hangzhou Hangke Optoelectronics Co., Ltd., Hangzhou (CN)

( * ) Notice: Subject to any disclaimer, the term of this patent is extended or adjusted under 35 U.S.C. 154(b) by 0 days.

(21) Appl. No.: 18/049,124

(22) Filed: Oct. 24, 2022

(65) Prior Publication Data

US 2023/0243486 A1 Aug. 3, 2023

(30) Foreign Application Priority Data

Jan. 28, 2022 (CN) ......................... 202210108187.1
Jan. 28, 2022 (CN) ......................... 202220238972.3
Mar. 2, 2022 (CN) ......................... 202210204722.3
Mar. 2, 2022 (CN) ......................... 202220448930.3
Sep. 20, 2022 (CN) ......................... 202222486941.3

(51) Int. Cl.
*F21V 17/10* (2006.01)

(52) U.S. Cl.
CPC .......... *F21V 17/102* (2013.01); *F21V 17/108* (2013.01)

(58) Field of Classification Search
CPC . F21K 9/237; F21K 9/238; F21K 9/65; F21K 9/66; F21K 9/27; F21K 9/232
See application file for complete search history.

(56) References Cited

U.S. PATENT DOCUMENTS

2012/0087121 A1* 4/2012 Yang ....................... F21V 29/74 362/277
2013/0043781 A1* 2/2013 Wang ...................... F21K 9/232 313/46
2016/0320047 A1* 11/2016 Zhou ...................... F21V 23/006
2017/0191623 A1* 7/2017 Ma .......................... F21K 9/238
(Continued)

FOREIGN PATENT DOCUMENTS

CN 111089233 * 12/2019 ............... F21K 9/90
KR 101665548 * 5/2015 .......... F21V 23/0428
KR 102099966 * 8/2019 ............... F21K 9/23

OTHER PUBLICATIONS

English Machine Translation of KR 102099966 provided by ESPACENET (Year: 2019).*

*Primary Examiner* — Zheng Song
(74) *Attorney, Agent, or Firm* — Schwegman Lundberg & Woessner, P.A.

(57) ABSTRACT

A line lamp is provided, which includes a power connection assembly, a light transmissive housing and one or more lamp lines. Lamp lines includes a fixed end electrically connected with the power connection assembly and a free end provided with a first connecting member, free end, and the light transmissive housing is provided with a second connecting member matched with the first connecting member. The first connecting member is a first suction member; the second connecting member is a second suction member, and the first suction member is in suction connection with the second suction member. Or, the first connecting member is a first hooking member; the second connecting member is a second hooking member, and the first hooking member is hooked with the second hooking member.

20 Claims, 11 Drawing Sheets

(56) References Cited

U.S. PATENT DOCUMENTS

2019/0093831 A1* 3/2019 Jiang ........................ F21K 9/237
2019/0301686 A1* 10/2019 Jiang ...................... F21V 19/003
2020/0144230 A1* 5/2020 Lin ......................... H01L 33/62

* cited by examiner

LINE LAMP

CROSS REFERENCE TO RELATED APPLICATION

This Non-provisional application claims priority under 35 U.S.C. § 119(a) to Chinese Patent Application No. 202210108187.1, filed on 28 Jan. 2022, Chinese Patent Application No. 202220238972.4, filed on 28 Jan. 2022, Chinese Patent Application No. 202210204722.3, filed on 02 Mar. 2022, Chinese Patent Application No. 202220448930.3, filed on 02 Mar. 2022, and to Chinese Patent Application No. 202222486941.3, filed on 20 Sep. 2022, the entire contents of which are hereby incorporated by reference in its entirety.

TECHNICAL FIELD

The disclosure relates to a field of lighting, in particular to a line lamp.

BACKGROUND ART

Traditional lamps or bulb lamps have a single and unchangeable structure. For the bulb lamps, filament lamps and LED filament lamps are common types, with a filament structure being fixed by a stem. For common lamps, such as ceiling lamps and chandeliers, a structure of a lamp board, a lamp sheet or the like is generally adopted, while for the chandeliers, the bulb lamps are installed in decorative parts. Moreover, at present, traditional lamps have not designed the lamp structure by using a filament structure.

SUMMARY

In view of shortcomings in the prior art, a novel line lamp is provided in the disclosure.

In order to solve the above technical problems, the present disclosure provides following technical solutions.

A line lamp includes a power connection assembly, a light transmissive housing and one or more lamp lines. Each of the lamp lines includes a fixed end and a free end, the fixed end is electrically connected with the power connection assembly, the free end of the lamp line is provided with a first connecting member, and the light transmissive housing or the power connection assembly is provided with a second connecting member matched with the first connecting member.

Optionally, the first connecting member is a first suction member; the second connecting member is a second suction member, and the first suction member is in suction connection or adsorption connection with the second suction member, or fixed connected (for example, connected by gluing, or fix an end of the filament directly).

Optionally, the first connecting member is a first hooking member; the second connecting member is a second hooking member, and the first hooking member is hooked with the second hooking member.

Optionally, the second connecting member can be movably installed in the light transmissive housing.

Optionally, the first suction member is a magnet member or a ferromagnetic suction member, and the second suction member is a ferromagnetic suction member or a magnet member corresponding to the first suction member.

Optionally, the second suction member includes a magnet member or a ferromagnetic suction member provided on an inner wall or outer wall of the light transmissive housing.

Optionally, the second suction member includes a magnet or ferromagnetic suction member provided in or shaped on the light transmissive housing.

Optionally, the first hooking member is a hook or a hanging ring fixed to the free end of the lamp line, and the second hooking member is a hook or a hanging ring fixed to the inner wall of the light transmissive housing.

Optionally, it further includes a slideway inside or outside the light transmissive housing, and the second connecting member is installed on the slideway.

Optionally, an end of the power connection assembly is detachably connected with the light transmissive housing.

Optionally, it includes at least two lamp lines, free ends of the two lamp lines are connected by a connecting part, and the connecting part is connected with the second connecting member.

Optionally, it further includes a lamp board installed at an end of the power connection assembly.

Optionally, the lamp board and the lamp line include light sources, and the light sources are one or more combinations of a white light source, a red light source, a green light source or a blue light source.

Optionally, the first hooking member and/or the second hooking member is a spring member.

The disclosure has advantages as follows:

The line lamp according to the disclosure has a structure different from that of a common lamp and the lamp line droops to form a smart shape, and a problem of random shaking of the lamp line is addressed by the connecting member, and at the same time, provision of the connecting member also enables style of the lamp line to be adjusted and changed.

Different from traditional filament bulb lamps, the line lamp of the present invention can be used not only as a bulb, but also as a lamp, instead of being required to be installed on a lamp fitting like the traditional bulb lamps.

In addition, the filament structure inside the housing can be designed with magnetic attractive fittings, so that the filament can be fixed to a certain extent while having drooping effect with gravity, which is more ornamental. In addition, due to insufficient weight of the filament, it may be bent after installation, and the filament can be straightened through a magnetic attractive structure.

BRIEF DESCRIPTION OF THE DRAWINGS

In order to explain the embodiments of the present disclosure or the technical scheme in the prior art more clearly, the drawings required in the description of the embodiments or the prior art will be briefly introduced below; obviously, the drawings in the following description are only some embodiments of the present disclosure, and other drawings can be obtained according to these drawings by those of ordinary skill in the art without paying creative labor.

DETAILED DESCRIPTION

The present disclosure will be further described in detail with reference to the following examples which present explanation the present disclosure and the present disclosure is not limited to the following examples.

Embodiment 1

Figure 1:
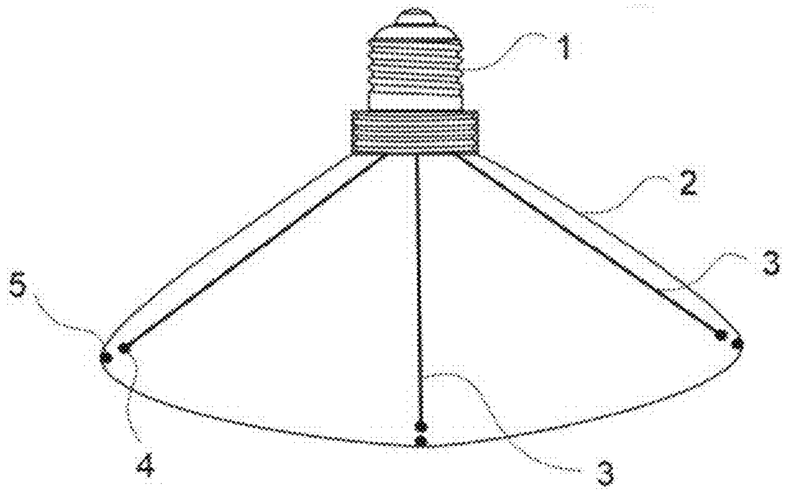
FIG. 1 is a schematic diagram of a line lamp.
Figure 6:
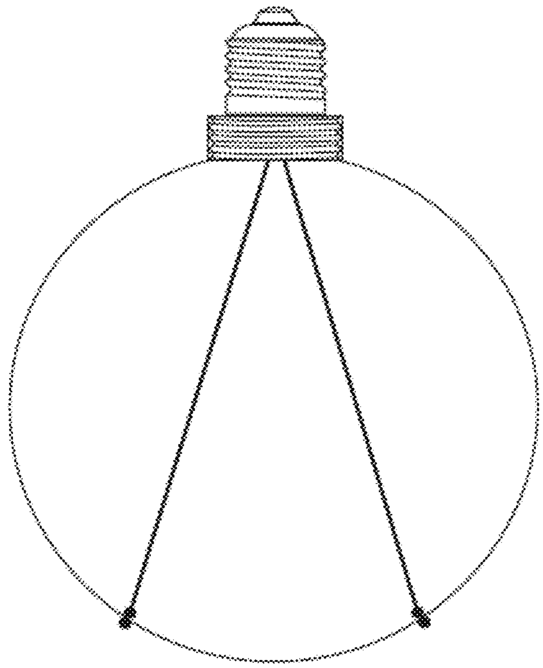
FIG. 6 is another schematic diagram of a line lamp.

A line lamp, as shown in FIGS. 1 and 6, includes a power connection assembly 1, a light transmissive housing 2 and one or more lamp lines 3. Each of the lamp lines includes a fixed end and a free end, the fixed end is electrically connected with the power connection assembly, the free end of the lamp line is provided with a first connecting member, and the light transmissive housing is provided with a second connecting member matched with the first connecting member. Each first connecting member is matched with one second connecting member in a contact or non-contact manner.

In this embodiment, the free end of the lamp line is provided with a first connecting member, the first connecting member is a first suction member 4; the light transmissive housing is provided with a second connecting member matched with the first connecting member, and the second connecting member is a second suction member 5, and the first suction member is in suction connection with the second suction member.

The first suction member and the second suction member can be viscous substances, can be suction cups, can be two solder joints, or can be magnetic elements. In the following, taking magnetic adsorption as an example, it will be described with reference to FIGS. 1 and 2.

In an implementation, the first suction member is a magnet member or a ferromagnetic suction member, and the second suction member is a ferromagnetic suction member or a magnet member corresponding to the first suction member.

For example, there are three lamp lines. Fixed ends of the three lamp lines are electrically connected with the power connection assembly, and free ends thereof are each fixed with a magnet, which is generally of a small size structure and does not affect overall aesthetics of the lamp lines. An inner surface of the light transmissive housing is respectively provided with three ferromagnetic suction members with their volumes being matched with magnet members. This is preferred for this embodiment and a specific structure and shape are not limited.

On the contrary, the free ends of the lamp lines are each fixed with a ferromagnetic suction member, which is generally of a small structure and does not affect overall aesthetics of the lamp lines. The inner surface of the light transmissive housing are respectively provided with three magnet members with their volumes being matched with ferromagnetic suction members.

The ferromagnetic suction members generally use metals such as iron, cobalt and nickel, or composite suction members doped with these metals that can adsorb magnets.

As another example, both the first and second suction members are magnets. In this scheme, if the S and N poles of the two magnets are opposite, a magnetic attraction connection can be realized. Because of characteristics of the magnetic connection, a contact or non-contact fixing can be realized. With configuration of the first suction member and the second suction member, the lamp line can be shaped, which not only fixes the lamp line, but also aesthetically molds the lamp line.

Embodiment 2

This embodiment is different from Embodiment 1 in a setting mode of the second suction member. In Embodiment 1, the second suction member can be considered to be provided at a point where several fixed ferromagnetic suction members or magnets are mounted to the inner surface of the light transmissive housing.

In this embodiment, the second suction member can be two suction members installed inside and outside the light transmissive housing respectively, such as one magnet and one ferromagnetic suction member, which are tightly sucked through the light transmissive housing. The external suction member can be moved to drive the internal suction member to move. At this time, a position of the first suction member connected with the inner suction member can be adjusted at will, so as to adjust a position of the lamp line.

Embodiment 3

This embodiment is different from Embodiment 1 and Embodiment 2 in provision of the second suction member. In this embodiment, the second suction member includes a magnet or ferromagnetic suction member provided in or shaped on the light transmissive housing.

In production of the light transmissive housing, the suction member is pressed into the inner layer of the light transmissive housing, and the suction member herein can be in a form of a dot, a strip or a sheet. For example, where dot-shaped suction members are used, each of the lamp lines corresponds to one suction member. For example, where sheet-shaped suction members whose areas are larger than those of the point-shaped ones are used, a plurality of first suction members can be absorbed. For example, where strip-shaped suction members are used, the first suction member can be displaced on the strip-shaped suction member to adjust its position. Similar structures can be obtained by analogy.

In other embodiments, the suction member can be attached to the inside or outside of the light transmissive housing.

Embodiment 4

A line lamp, as shown in FIG. 1, includes a power connection assembly 1, a light transmissive housing 2 and one or more lamp lines 3. Each of the lamp lines includes a fixed end and a free end, the fixed end is electrically connected with the power connection assembly, the free end of the lamp line is provided with a first connecting member, and the light transmissive housing is provided with a second connecting member matched with the first connecting member.

In this embodiment, the free end of the lamp line is provided with a first connecting member, the first connecting member is a first hooking member; the light transmissive housing is provided with a second connecting member matched with the first connecting member, and the second connecting member is a second hooking member, and the first hooking member is hooked with the second hooking member.

The first hooking member is a hook or a hanging ring fixed to the free end of the lamp line, and the second hooking member is a hook or a hanging ring fixed to the inner wall of the light transmissive housing.

Embodiment 5

Figure 2:
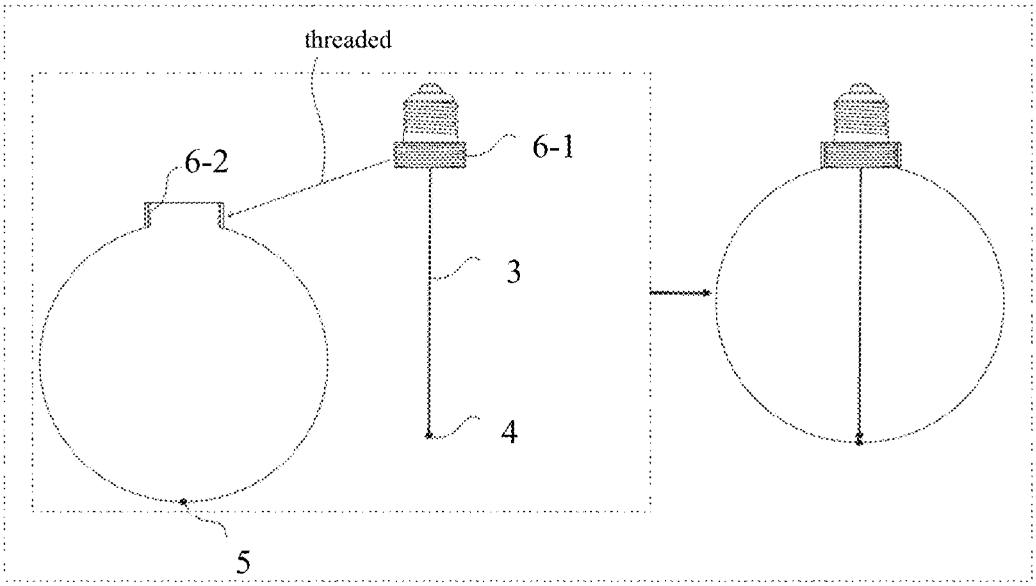
FIG. 2 is a schematic diagram of a disassembled line lamp.

A line lamp, as shown in FIG. 2, includes a power connection assembly 1, a light transmissive housing 2 and one or more lamp lines 3. Each of the lamp lines includes a fixed end and a free end, the fixed end is electrically connected with the power connection assembly, the free end of the lamp line is provided with a first connecting member, and the light transmissive housing is provided with a second connecting member matched with the first connecting member.

An end of the power connection assembly provided in this embodiment is detachably connected with the light transmissive housing. For example, a lower part of the power connection assembly is provided with a helical structure 6-1, and correspondingly, the light transmissive housing is provided with a helical structure 6-2 corresponding to the helical structure, and specific positions of an internal thread and an external thread are not limited.

Embodiment 6

Figure 3:
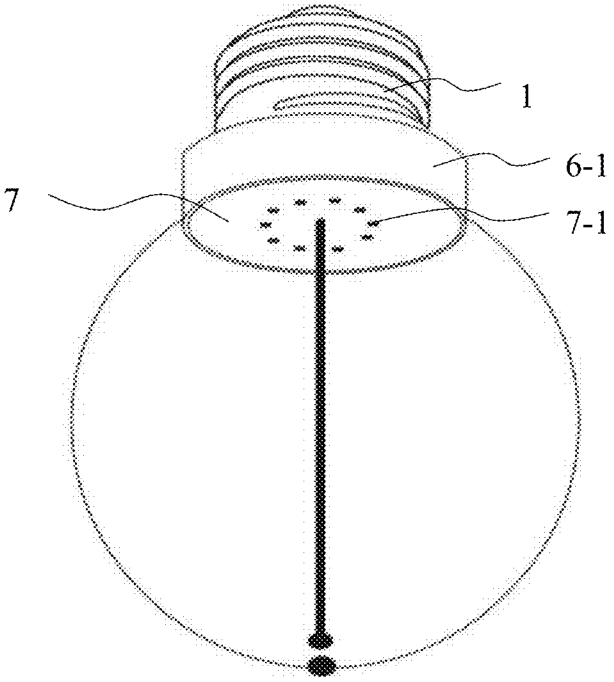
FIG. 3 is a schematic diagram of a line lamp according to Embodiment 6.

On a basis of the above embodiments, this embodiment can be varied. As shown in FIG. 3, its structure further includes a lamp board 7 installed at an end of the power connection assembly. A plurality of LED chips or LED lamp beads 7-1 are mounted on the lamp board.

An end of the power connection assembly provided in this embodiment is detachably connected with the light transmissive housing. For example, the lower part of the power connection assembly is provided with a spiral structure 6-1. In this embodiment, the spiral structure is an inner spiral structure, and the light transmissive housing is an outer spiral structure.

It can be conceivable that the lower part of the power connection assembly can be connected with the light transmissive housing by a buckle or by glue, and other connection structures are not restricted.

Embodiment 7

In this embodiment, a lamp including at least two lamp lines is disclosed, and free ends of the two lamp lines are connected by a connecting part, the connecting part is a magnet member, a ferromagnetic suction member or is of other non-magnetic materials.

Figure 4:
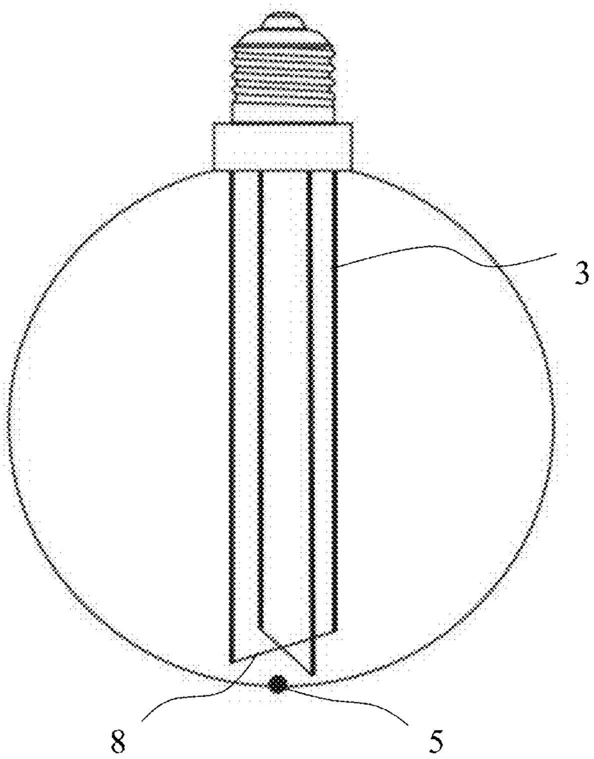
FIG. 4 is a schematic diagram of a line lamp according to Embodiment 7.

As shown in FIG. 4, taking four lamp lines (a structure with two or more other lines is similar) as an example, the connecting part is a cross-shaped or X-shaped bracket 8, and four end points of the bracket are connected to four free ends of the four lamp lines for fixing. The bracket is a magnet member or a ferromagnetic suction member, and the second suction member 5 is a ferromagnetic suction member or a magnet member corresponding to the bracket 8. Structural description of this part refers to the above-mentioned embodiments and will not be repeated here.

Figure 5:
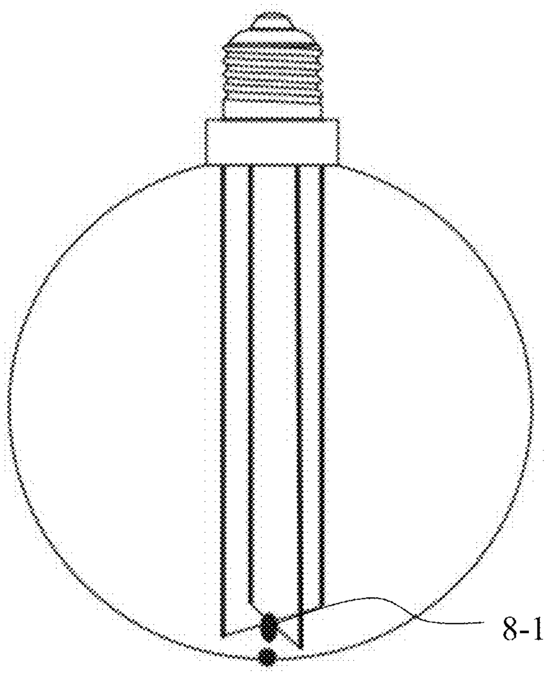
FIG. 5 is a schematic diagram of another line lamp according to Embodiment 7.

On the other hand, as shown in FIG. 5, when the connecting part is made of other non-magnetic materials, for example, plastic or hard rubber, then a magnet member or a ferromagnetic suction member 8-1 is installed on the connecting part. As such, a design idea of the disclosure can be achieved.

It should be noted that the connecting part of this embodiment is connected with the second suction member in a contact or non-contact manner. The second suction member is adjusted accordingly according to selection of the connecting part in this embodiment.

In another embodiment, the connecting member further includes a hook or a hanging ring, and correspondingly the second connecting member is a hook or a hanging ring corresponding to the connecting member. A specific structure will not be described in detail, which can refer to previous embodiments.

Embodiment 8

Figure 9:
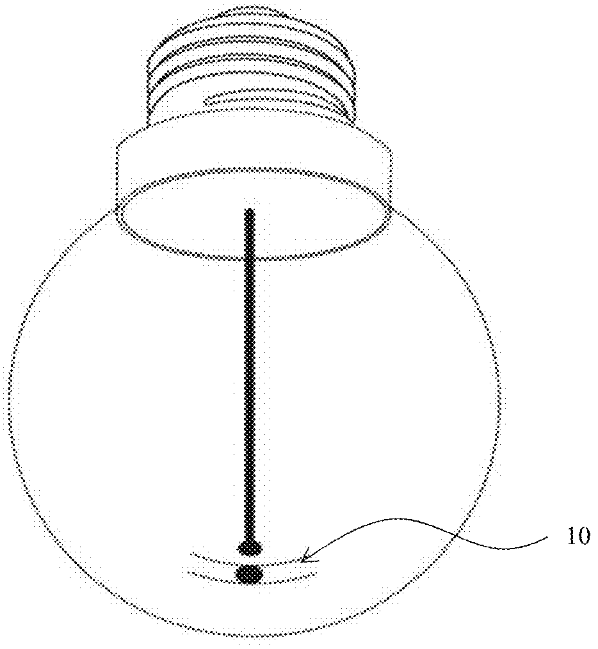
FIG. 9 is a schematic diagram of another line lamp according to Embodiment 8.

As shown in FIG. 9, the second connecting member can be movably installed in the light transmissive housing, which is different from other embodiments and can be applied to other embodiments at the same time. Specifically, it is conceivable to provide a slideway inside or outside the light transmissive housing, and the second connecting member is installed on the slideway.

Alternatively, the second connecting member includes a movable piece and a slideway provided inside the light transmissive housing, and the movable piece is installed on the slideway. The second connecting member can be a second hooking member (referring to Embodiment 4) or a second suction member (referring to Embodiment 1).

Generally, the slideway is a concave groove on the inner wall of the housing, and the movable piece includes a slider embedded in the concave groove and a suction member or a hooking member installed on the slider.

In another implementation, more than one slideway is provided on the light transmissive housing, and the second connecting member is clamped on the slideway to realize a sliding connection on the slideway. The slideway disclosed in this embodiment can be integrally formed or assembled separately.

Figure 10:
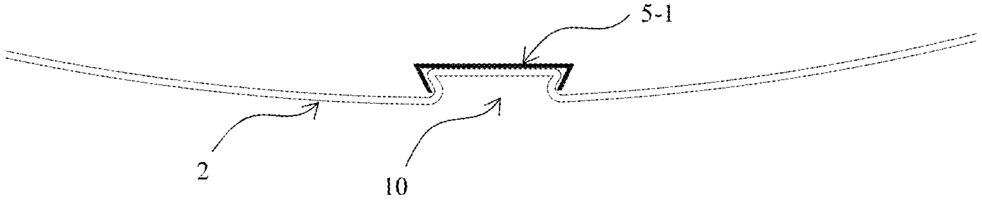
FIG. 10 is a sectional view of one of forms of a structure of a slideway according to Embodiment 8.
Figure 11:
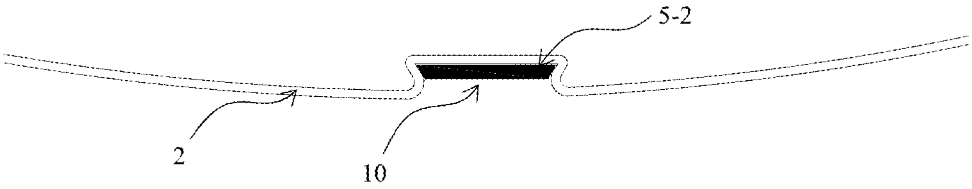
FIG. 11 is a sectional view of another form of the structure of the slideway according to Embodiment 8.

A cross-sectional view of one of forms of a structure of the slideway are respectively disclosed in FIGS. 10 and 11. The light transmissive housing 2, the slideway 10 and the first suction member 5-1 are shown in FIG. 10, and the light transmissive housing 2, the slideway 10 and the second suction member 5-2 are shown in FIG. 11. When the light transmissive housing is produced and shaped, more than one slideway protruding into an inner cavity of the light transmissive housing is prepared with a mold, and the slideway includes an inner groove outside the light transmissive housing and a convex groove inside the light transmissive housing. In FIG. 10, the first suction member 5-1 is arranged inside the light transmissive housing and clamped on a surface of a convex groove. In FIG. 11, the second suction member 5-2 is arranged outside the light transmissive housing and clamped in the groove.

According to FIG. 10 and FIG. 11, another implementation can be conceivable that there is more than one slideway protruding towards outside of the light transmissive housing, and the slideway includes a convex groove outside the light transmissive housing and a groove inside the light transmissive housing. The second suction member can be arranged inside the light transmissive housing and clamped in the groove. The second suction member can also be arranged outside the light transmissive housing and clamped on the convex groove.

Embodiment 9

Figure 7:
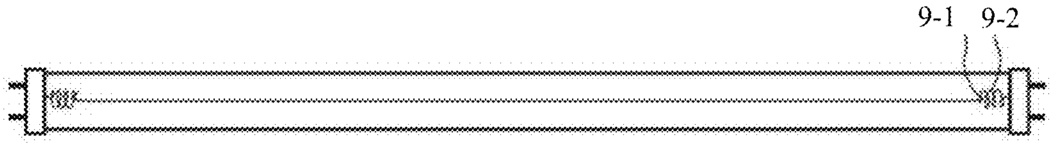
FIG. 7 is a schematic diagram of a line lamp according to Embodiment 9.
Figure 8:
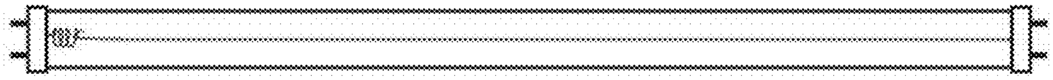
FIG. 8 is a schematic diagram of another line lamp according to Embodiment 9.

As shown in FIGS. 7 and 8, an elongated tubular line lamp is disclosed, in which the light transmissive housing is a long tube, and one or more lamp lines are arranged in the tube. Taking one lamp line as an example, a structure with multiple lamp lines can be obtained according to one lamp line.

In this embodiment, both the fixed end and the free end of the lamp line can be movably connected. As shown in FIG. 7, both the free end and the fixed end of the lamp line are provided with a first connecting member, and the first connecting member is a hook 9-1 and the second connecting member is a spring member 9-2, and the hook is connected to the spring member.

As shown in FIG. 7, only the free end of the lamp line is hooked with an end of the long tube through the first connecting member (the hook) and the second connecting member. The second connecting member is a spring member, a hook or a hanging ring. The first connecting member may also be a spring member. The spring member can be provided with a hooking part for hooking, such as a hitch or a hanging ring, or the spring member can be provided without hook part.

To sum up, on a basis of a general idea of the present disclosure, it can be considered that two ends of the lamp line are the fixed end and the free end respectively, one end is connected to the power connection assembly through the first connecting member, and the other end is also connected to another power connection assembly through the first connecting member, as shown in FIG. 7.

On the basis of the general idea of the present disclosure, similarly in the light transmissive housing of the long tube shown in FIG. 8, if only one end of the long tube is with the power connection assembly, the free end is connected to the end of the long tube through the first connecting member and the second connecting member, and the fixed end is directly and fixedly connected to the power connection assembly; or, the free end is connected to the end of the long tube through the first connecting member and the second connecting member, and the fixed end is connected to the power connection assembly through the first connecting member and the second connecting member.

Embodiment 10

This embodiment provides an LED lamp line that can be cropped based on any of Embodiments 1-9. LED chips or LED beads in the LED lamp lines are connected in parallel between single or multiple series connected lamp lines, with a substrate being a flexible substrate, which can be cropped. Specifically, for convenience of use, it can be marked in a clipping position.

Embodiment 11

A characteristic scheme is disclosed in this embodiment, and it is considered that the second connecting member is the light transmissive housing. The first connecting member is a weight piece, and when the lamp is installed, the lamp line is hung and fixed by gravity with the weight piece. Because the lamp line is light, some heavy materials are usually prepared on a surface of the lamp line so as to realize natural hanging, but in this scheme, production cost is increased, and at the same time, aesthetics of the lamp line decreases. However, using the weight piece presents good effect.

Embodiment 12

A magnetic attractive lamp, as shown in FIGS. 12 to 16, includes a housing 2', one or more filaments 3', a lamp cover structure fixed with one end of the filament, and a lamp base connected with the other end of the filament. The lamp cover structure includes a first cover body 13 connected with the housing, and the lamp base includes a base cover body 14 connected with the housing. The housing is a transparent or translucent case;

The lamp base further includes a second magnetic attractive member 5';

A first magnetic attractive member 4' is installed at an end of the filament proximate to the lamp base;

The second magnetic attractive member and the first magnetic attractive member are connected in contact or non-contact.

An outer surface of the housing of this embodiment is an arcuate surface, and an outer surface of the first cover body and the base cover body are arcuate surfaces adapted to the outer surface of the housing. A natural transition of a joint between the arcuate surfaces of the first cover body and the base cover body and the arcuate surface of the housing after the assembly, and smooth connection of several surfaces of an overall housing structure of the lamp can be ensured. Based on other structures, the housing can also be set with a geometrical body or other designed shapes.

Figure 12:
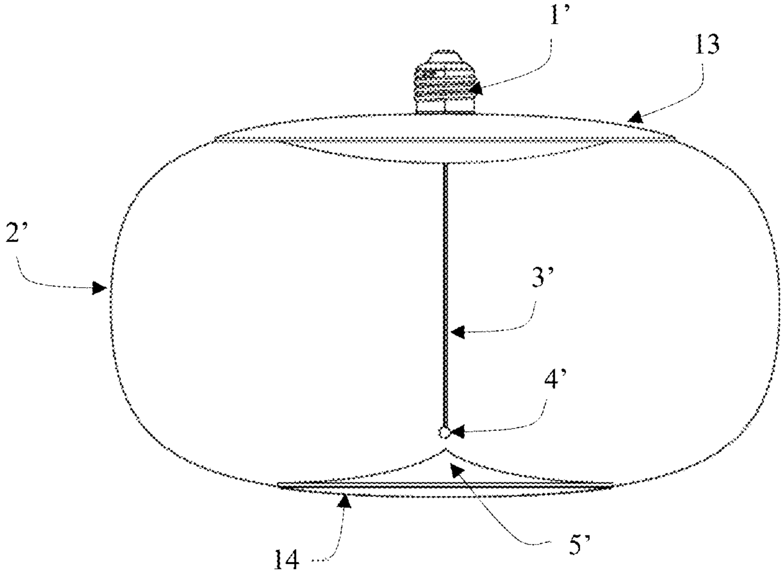
FIG. 12 is a schematic diagram of a lamp.
Figure 13:
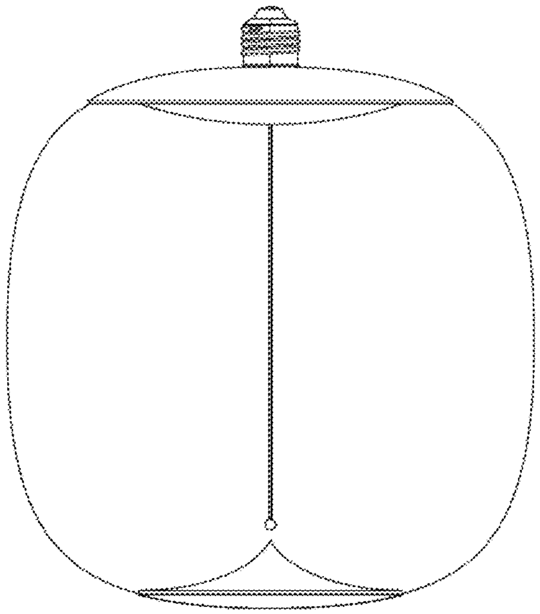
FIG. 13 is a schematic diagram of a lamp.
Figure 14:
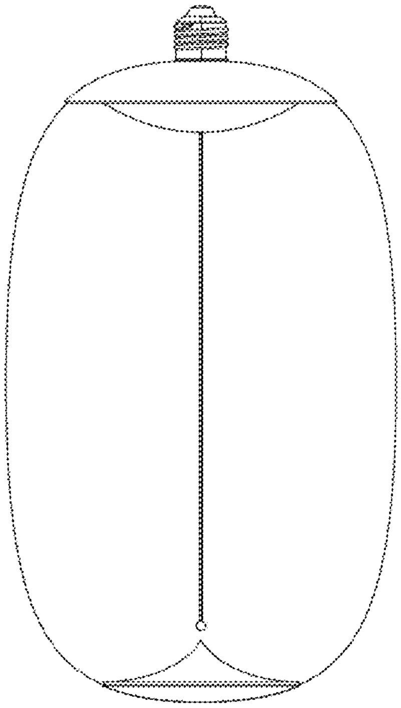
FIG. 14 is a schematic diagram of a lamp.

As shown in FIGS. 12, 13 and 14, a structure of the housing includes a short and round shape or a slender shape, that is, an aspect ratio of the housing can be adjusted as long as an arcuate surface structure is provided. Accordingly, a filament length, structures of the first cover body and the base cover body are further adjusted accordingly.

The lamp cover structure further includes an electrical connector 1' and a second cover body 15. The electrical connector is a component connected with a power supply, the electrical connector is connected with the first cover body, and the first cover body is connected with the second cover body. A control circuit board is installed between the first cover body 13 and the second cover body 15, and the filament passes through the second cover body to be electrically connected with the control circuit board.

The housing is formed into a structure with hollow upper and lower end faces by injection molding, on which then the lamp cover structure and the lamp base are installed.

Figure 20:
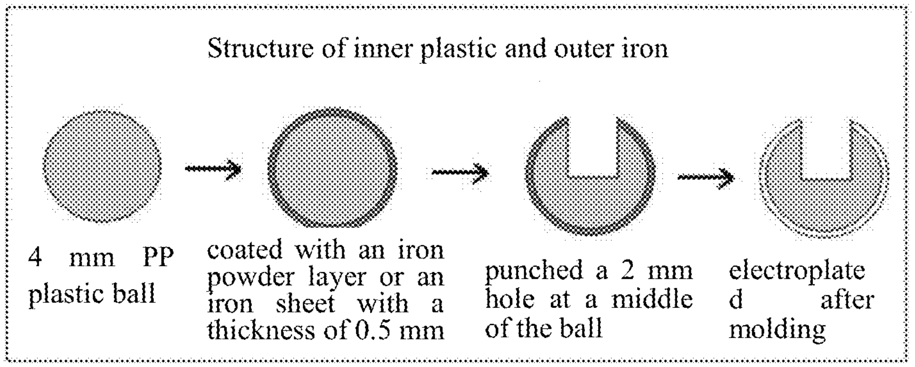
FIG. 20 is a flow chart of preparation of a first magnetic attractive member.

As shown in FIG. 20, a structure and a preparation method of a first magnetic attractive member 4' are provided. The first magnetic attractive member 4' includes an internal insulator, and a magnetic material layer or a magnetizable material layer is provided outside the insulator. The internal insulator is taken for example as a 4 mm PP plastic ball as shown, which is then coated with an iron powder layer or an iron sheet with a thickness of 0.5 mm, is punched at a middle of the ball, and is electroplated after molding. A hole at the middle is configured to be connected with an end of the filament. Dimensions and materials disclosed in this embodiment and FIG. 20 are just examples, which can be referred by those skilled in the art to perform structural and technological adjustments.

Figure 21:
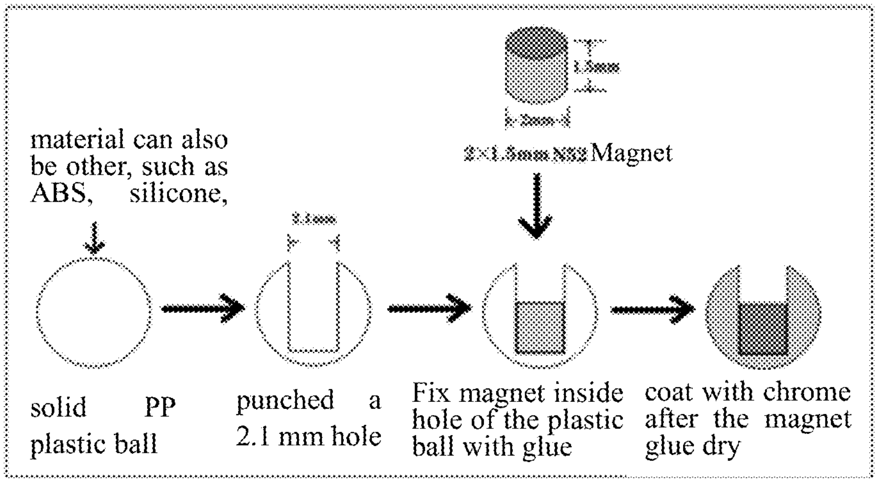
FIG. 21 is another flow chart of preparation of a first magnetic attractive member.

As shown in FIG. 21, another structure and preparation method are provided. The first magnetic attractive member 4' includes a magnetic material member or a magnetizable material member therein, and an insulating material layer is provided outside the magnetic material member or the magnetizable material member. As shown in FIG. 21, the insulating material member is taken as for example an ABS or silica gel ball, or the like, which is punched in the ball and into which a magnet is placed, then the magnet is fixed inside the insulating material member with glue, and finally the insulating material member is coated externally, for example coated with chrome. An upper part of the hole at the middle with the magnet being placed is configured to be connected with the end of the filament.

Dimensions and materials disclosed in this embodiment and FIG. 21 are just examples, which can be referred by those skilled in the art to perform structural and technological adjustments.

Another conceivable first magnetic attractive member is further provided in this embodiment, that is, a mixed fixture is formed by using the mixed magnetic material or magnetizable material.

Selection of the magnetic material or the magnetizable material is based on material matching of the second magnetic attractive member. The first magnetic attractive member disclosed in this embodiment adopts the magnet (the magnetizable material), the iron powder and the iron sheet (the magnetic material) as examples, which can be changed by referring to material selection of the second magnetic attractive member according to core idea of this scheme.

The filament is an unshaped filament made of a flexible substrate, which naturally droops under influence of gravity, and is attracted and fixed in contact or in non-contact by the second magnetic attractive member and the first magnetic attractive member. A non-contact mode in shown in the figure, and connection is made by a magnetic force (an attractive force).

In another scheme, the filament is a shaped filament with a bent structure, a fold structure or a spiral structure. In this case, a substrate of the filament is a flexible substrate or a rigid substrate, the rigid substrate can be a PCB or an aluminum substrate, and the flexible substrate can be a FPC substrate.

Specifically, the filament in this embodiment includes more than one luminescent particle and at least two sections of conductive components. The luminescent particles can be LED chips. That is, the luminescent particles can be LED bare dies directly fixed to a strip-shaped substrate.

Further, the filament also includes a protective layer, and luminescent particles are positioned in a light transmissive protective layer; part or all of the conductive components are located in the light transmissive protective layer. In this embodiment, the luminescent particles and the conductive components are both located in the light transmissive protective layer to shape the filament.

The LED chips in this scheme are different from the traditional LED lamp beads for which there is a large difference in finished filament products and there is a thick packaging layer outside the LED lamp beads because the lamp beads are packaged LED chips, and when the traditional LED lamp beads are made into a filament or lamp line, defects exist as follows: 1) a distance between two luminescent particles is large, and when the luminescent particles are connected in series or in parallel to form a straight line, there will be an obvious gap with low light intensity after lighting, resulting in a whole lamp line to be connected point light sources, instead of a complete filament with visually indistinguishable light intensity difference. 2) Because the LED beads is much larger than the LED chips in volume, which, when connected, are with a large cross section, and "filament" effect cannot be achieved and its preparation is rough, and filament luminous effect cannot be achieved after the LED beads are further made into the lamp line. This problem can be solved by the LED chips well.

The substrate adopts a strip-shaped substrate or a spiral substrate, and the LED chip and the conductive components mounted on the strip-shaped substrate or the spiral substrate.

It can be conceived that a substrate structure is not adopted in the filament, and the substrate can be directly replaced with an electrical connection wire, and then the protective layer can be arranged outside the LED chips and the electrical connection wire.

Figure 22:
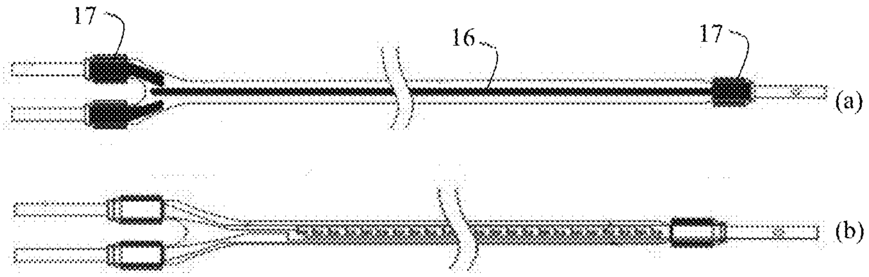
FIG. 22 is a schematic diagram of a filament structure with a reinforcing member.

For strength of a lamp bar, the substrate is provided with a reinforcing member, such as a reinforcing rib 16 matching the length of the filament. As shown in FIG. 22(*a*), a reinforcing rib structure is provided at a back of the filament, and as shown in FIG. 22(*b*), an LED chip structure is provided at a front of the filament.

A reinforcing structure, such as a metal or nonmetal reinforcing rib such as a nylon reinforcing rib, can also be installed in the protective layer along a length direction of the filament. For better reinforcing effect, one reinforcing rib can be arranged on both sides of the filament or reinforcing ribs can be arranged in the filament structure according to positions. The structures with and without the substrate described above are adaptable to improvement from the reinforcing rib.

Other reinforcing structures include shaping pieces 17 installed at both ends of the filament.

The light transmissive housing in this embodiment is a transparent or translucent housing. Taking the transparent housing as an example, glass, plastic and other materials can be adopted to be made into a housing with effect of cutfaces of crystals, and this kind of housing can not only reveal light source effect of an internal lamp line, but also refract other brilliance through the housing.

For example, ordinary glass with a smooth surface is fired into a glass housing with gray gradient, which is small at top and big at bottom and with an arcuate surface. Further, colors of outer surfaces of the lamp cover structure and the lamp base are set to be similar to that of the glass housing, with a natural and aesthetic overall color.

On a premise of a cost-saving and rapid process, a fully transparent or translucent housing with color was prepared by a resin molding process.

Embodiment 13

Figure 15:
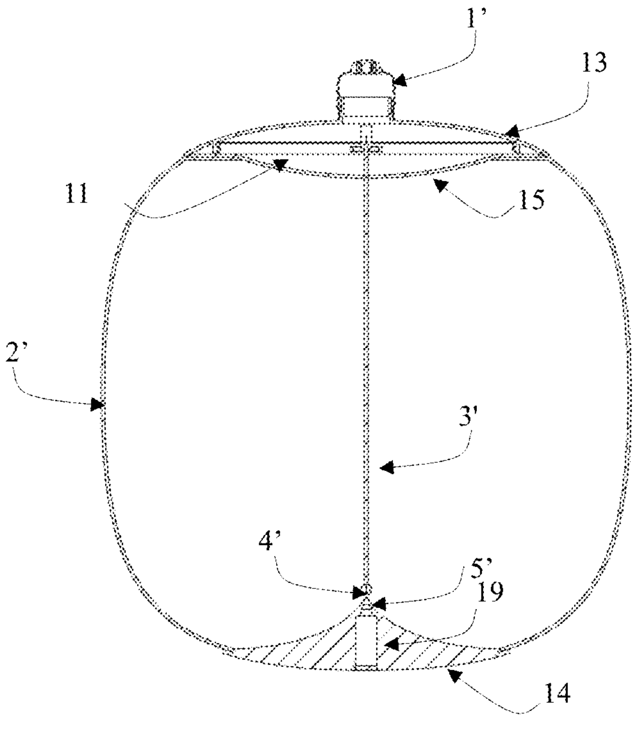
FIG. 15 is a sectional view of a lamp.

A lamp, referring to the structure according to Embodiment 12 and referring to FIG. 15, is provided. The lamp base further includes an outer structure 18, which is a convex structure installed inside the base cover body and is provided with a second magnetic attractive member.

The convex structure of the outer structure is a cone, the second magnetic attractive member is arranged in the cone, a placing cavity 19 is arranged in the cone, the second magnetic attractive member is placed in the placing cavity, and the second magnetic attractive member 5' is installed proximate to an apex of the cone.

The cone includes a conoid or a pyramid. A pyramidal surface of the pyramid is any of one or more combination of a planar surface, a concave arcuate surface and a convex arcuate surface; and a conical surface of the conoid is any one of a planar surface, a concave arcuate surface and a convex arcuate surface. A cone with the planar surface can be understood as a straight line connecting left and right sides of a longitudinal section of the cone.

As other embodiments, the second magnetic attractive member can also be arranged at other positions, so long as adsorption connection or magnetic connection with the first magnetic attractive member can be achieved on a premise that processes allow.

Embodiment 14

Figure 16:
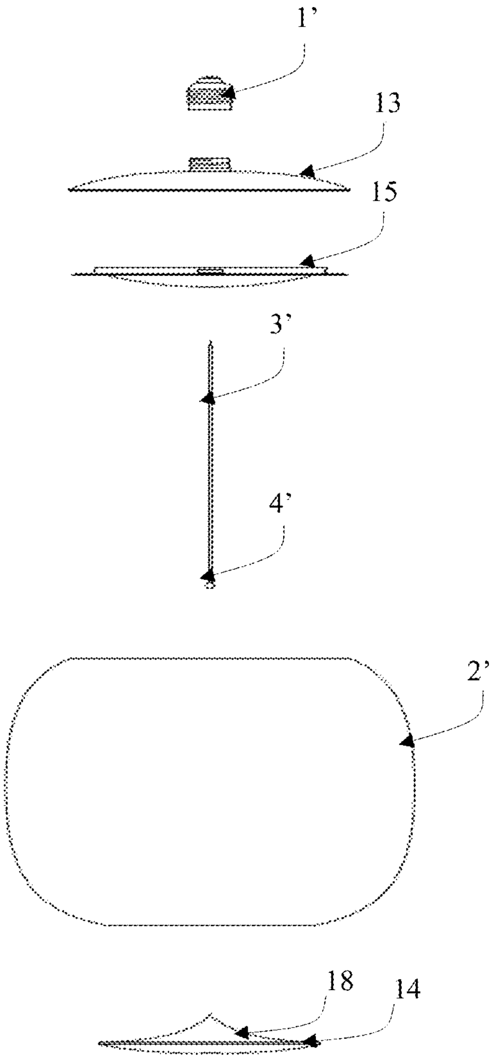
FIG. 16 is an exploded view of a lamp.

A lamp, referring to the structure according to Embodiment 12 and referring to FIGS. 12-3 and 16, is provided. The second magnetic attractive member is a convex structure fixed to the base cover body, and an apex of the convex structure is installed towards the lamp cover structure. That is, the whole convex structure is a magnetic structure, the second magnetic attractive member is a cone fixed to the base cover body, and an apex of the cone is installed towards the lamp cover structure. The cone includes a conoid or a pyramid, and a surface of the cone is a concave arcuate surface or a convex arcuate surface.

Embodiment 15

An LED light-emitting lamp board 11 is installed below the lamp structure, and a plurality of LED beads or LED chips 11-1 are installed on the LED light-emitting lamp board. Arrangement density of the LED beads or LED chips on the lamp board can be adjusted, and their shapes can also be designed as desired.

Figure 17:
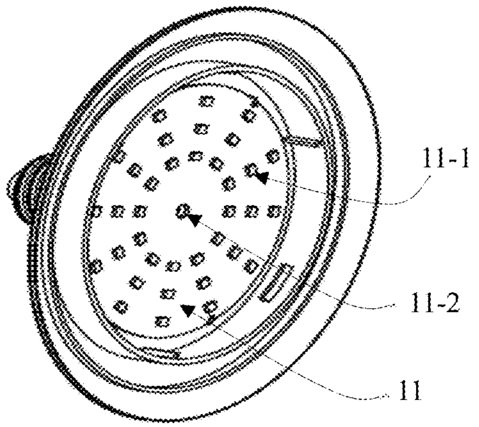
FIG. 17 is a schematic diagram of a lamp cover structure according to Embodiment 15.

As shown in FIG. 17, a light-emitting surface of the LED light-emitting board is installed in a direction toward an interior space of the lamp. Combined with the schemes according to Embodiment 12 to Embodiment 14, effect of simultaneous light emission at two positions obviously can be realized, with more distinctive light-emitting effect compared with a traditional lamp structure.

There is a through hole 11-2 at a middle of the LED board, and the filament passes through the through hole to be connected with the control circuit board installed on a back of the LED board.

For a specific installation position of the LED light-emitting board, reference can be made to a position shown in FIG. 15. The second cover body is located below the LED light-emitting board. In this embodiment, the second cover body needs to adopt a light transmissive cover body.

Embodiment 16

Figure 18:
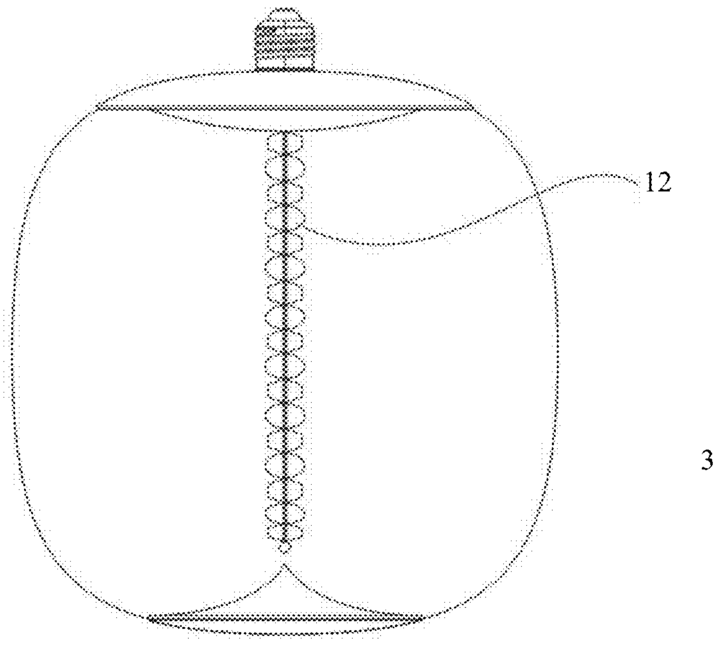
FIG. 18 is a schematic diagram of a lamp according to Embodiment 16.
Figure 19:
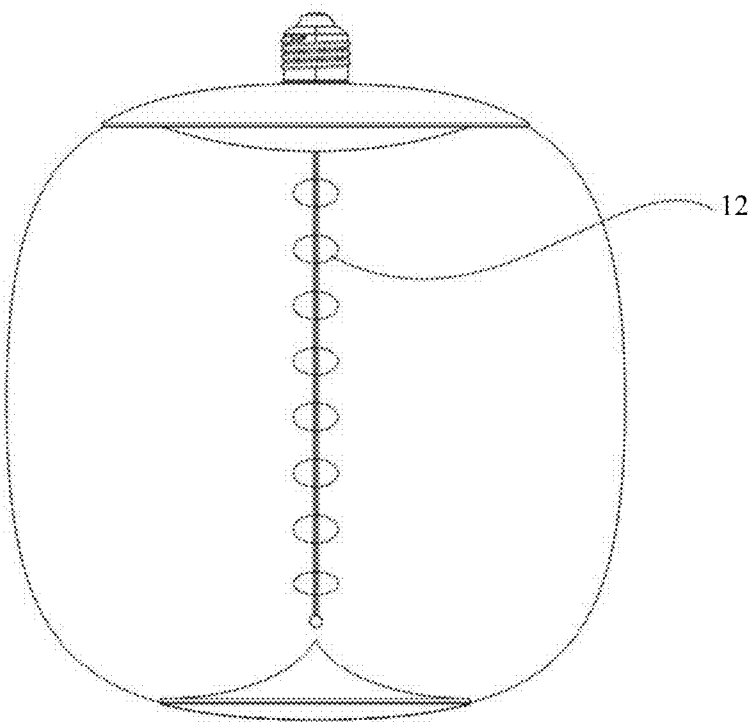
FIG. 19 is a schematic diagram of another lamp according to Embodiment 16.

As disclosed in Embodiment 12, the reinforcing member is arranged in the filament. Strength of the filament is enhanced with a technical feature that the reinforcing member includes reinforcing ribs arranged along the length direction of the filament. Further, decorative fittings 12 can be provided outside the filament. As shown in FIG. 18, an installation method of the filament can be that a stopper is provided at a tail end of the filament and the decorative fittings with the through hole are sleeved on the filament. As shown in FIG. 19, the decorative fittings can also be arranged at certain intervals, and the decorative fittings can be installed by an adhesive member, such as glue. Other conceivable methods include adhering the decorative fittings directly outside the filament.

The decorative fittings mentioned here are crystal fittings, glass beads and other similar decorations, which, when used in this scheme, are not only used for decoration. For example, the outer surface of the lamp bead can have cutfaces or textures, which are aesthetic in appearance and refract light with different luminous effects, thus avoiding direct glare light to a certain extent. A light emission angle can also be varied according to cutface design of the decorative fittings.

It should be noted that a shape of the light transmissive housing is changeable, that is, it can be circular, fan-shaped or a hollow frame housing composed of brackets. Shapes, structures and sizes of the first suction member and the second suction member are also variable, and shapes, structures and sizes of the first hooking member and the second hooking member are not limited.

It should be noted that the line lamp in the present disclosure can be a bulb lamp, a fluorescent lamp, or a light fixture. When it is the light fixture, the light transmissive housing is a lampshade; when it is the bulb lamp, the light transmissive housing is a bulb housing made of glass, plastic or other materials. The connection of the present disclosure can be a fixed connection or a movable connection, such as magnetic adsorption, hooking, etc. The fixed connection is to fix the connecting part directly in production, so it cannot be adjusted.

In the above embodiments, LED elements are used as the light source, but other light sources such as laser light sources and tungsten lamp light sources can still be used. The LED or laser light source adopts are one or more combinations of a white light source, a red light source, a green light source or a blue light source.

In addition, it should be noted that the specific embodiments described in this specification may have different shapes, names or the like of parts and components. Equivalent or simple changes made in accordance with the configurations, features and principles described in the inventive concept are included in the scope of protection of the inventive disclosure. Various modifications, supplements or similar replacements can be made to the described specific embodiments by those skilled in the art to which the present disclosure pertains, which fall within the protection scope of the present disclosure without departing from the structure of the present disclosure or beyond the scope defined by the claims.

What is claimed is:

1. A line lamp, comprising a power connection assembly, a light transmissive housing and one or more lamp lines, wherein the one or more lamp lines comprise a fixed end and a free end, the fixed end is electrically connected with the power connection assembly, the free end of the lamp line is provided with a first connecting member, and the light transmissive housing or the power connection assembly is provided with a second connecting member matched with the first connecting member;

wherein the first connecting member is a first suction member or a first hooking member; the second connecting member is a second suction member or a second hooking member, and the first suction member is in suction connection or adsorption connection or fixed connection with the second suction member, or the first hooking member is hooked with the second hooking member;

wherein the first hooking member is a hook or a hanging ring fixed to the free end of the lamp line, and the second hooking member is a hook or a hanging ring fixed to an inner wall of the light transmissive housing;

or the first hooking member and/or the second hooking member is a spring member.

2. The line lamp according to claim 1, wherein the second connecting member is movably installed within the light transmissive housing.

3. The line lamp according to claim 2, further comprising a slideway inside or outside the light transmissive housing, wherein the second connecting member is slidably installed at the slideway.

4. The line lamp according to claim 1, wherein the first suction member is a magnet member or a ferromagnetic suction member, and the second suction member is a ferromagnetic suction member or a magnet member corresponding to the first suction member.

5. The line lamp according to claim 4, comprising at least two lamp lines, wherein free ends of the two lamp lines are connected by a connecting part, and the connecting part is connected with the second connecting member.

6. The line lamp according to claim 1, wherein the second suction member comprises a magnet member or a ferromagnetic suction member provided on the inner wall or an outer wall of the light transmissive housing.

7. The line lamp according to claim 1, wherein the second suction member comprises a magnet or ferromagnetic suction member provided inside or shaped on the light transmissive housing.

8. The line lamp according to claim 1, wherein one end of the power connection assembly is detachably connected with the light transmissive housing.

9. The line lamp according to claim 1, further comprising a lamp board installed at an end of the power connection assembly.

10. A line lamp, comprising a power connection assembly, a light transmissive housing and one or more lamp lines, wherein the one or more lamp lines comprise a fixed end and a free end, the fixed end is electrically connected with the power connection assembly, the free end of the lamp line is provided with a first connecting member, and the light transmissive housing or the power connection assembly is provided with a second connecting member matched with the first connecting member, wherein the line lamp further comprises a lamp base; the free end of the lamp line is attracted and fixed in contact or in non-contact by the first connecting member and the second connecting member;

the light transmissive housing is a transparent or translucent housing;

the first connecting member is a first magnetic attractive member, and the second connecting member is a second magnetic attractive member;

the lamp base further comprises the second magnetic attractive member;

the first magnetic attractive member is installed at an end of the lamp line proximate to the lamp base; and the first magnetic attractive member and the second magnetic attractive member are connected in contact or non-contact.

11. The line lamp according to claim 10, wherein the line lamp further comprises a lamp cover structure fixed with the fixed end of the lamp line, the lamp cover structure comprises the power connection assembly, a first cover and a second cover, wherein the power connection assembly is a component for connecting with a supply power, the power connection assembly is connected with the first cover, and the first cover is connected with the second cover, and a control circuit board is installed between the first cover and the second cover, and the lamp line passes through the second cover to be electrically connected with the control circuit board.

12. The line lamp according to claim 11, wherein the lamp cover structure comprises a first cover body connected with the light transmissive housing, and the lamp base comprises a base cover body connected with the light transmissive housing, the lamp base further comprises an outer structure, the outer structure being a convex structure installed inside the base cover body and being provided with the second magnetic attractive member.

13. The line lamp according to claim 12, wherein the convex structure of the outer structure is a cone, the second magnetic attractive member is arranged in the cone, a placing cavity is arranged in the cone, the second magnetic attractive member is placed in the placing cavity, and the second magnetic attractive member is installed proximate to an apex of the cone.

14. The line lamp according to claim 13, wherein the cone comprises a conoid or a pyramid, a pyramidal surface of the pyramid being any of one or more combination of a planar surface, a concave arcuate surface and a convex arcuate surface; and a conical surface of the conoid being any one of a planar surface, a concave arcuate surface and a convex arcuate surface.

15. The line lamp according to claim 11, wherein the lamp cover structure comprises a first cover body connected with the light transmissive housing, and the lamp base comprises a base cover body connected with the light transmissive housing, the second magnetic attractive member is a convex structure fixed to the base cover body, and an apex of the convex structure is installed towards the lamp cover structure.

16. The line lamp according to claim 11, wherein an LED light-emitting panel is installed below the lamp cover structure, and a plurality of LED beads or LED chips are installed on the LED light-emitting panel.

17. The line lamp according to claim 10, wherein the first magnetic attractive member comprises an internal insulator, and a magnetic material layer or a magnetizable material layer is provided outside the insulator; or the first magnetic attractive member comprises a magnetic material member or a magnetizable material member therein, and an insulating material layer is provided outside the magnetic material member or the magnetizable material member.

18. The line lamp according to claim 10, wherein the first magnetic attractive member is a mixed fixture formed by mixing a magnetic material or a magnetizable material with an insulating material.

19. The line lamp according to claim 10, wherein a reinforcing member matched with the lamp line is installed in the lamp line, and the reinforcing member comprises reinforcing ribs arranged along a length direction of the lamp line.

20. A line lamp, comprising a power connection assembly, a light transmissive housing and one or more lamp lines, wherein the one or more lamp lines comprise a fixed end and a free end, the fixed end is electrically connected with the power connection assembly, the free end of the lamp line is provided with a first connecting member, and the light transmissive housing or the power connection assembly is provided with a second connecting member matched with the first connecting member, wherein the line lamp further comprises a lamp base; the free end of the lamp line is attracted and fixed in contact or in non-contact by the first connecting member and the second connecting member; the light transmissive housing is a transparent or translucent housing;

the first connecting member is a first magnetic attractive member, and the second connecting member is a second magnetic attractive member;

an inner wall of the light transmissive housing further comprises the second magnetic attractive member;

the first magnetic attractive member is installed at an end of the lamp line proximate to the lamp base; and the first magnetic attractive member and the second magnetic attractive member are connected in contact or non-contact.

* * * * *